(Model.)

3 Sheets—Sheet 1.

L. B. BERRIEN.
CORN PLANTER CHECK ROWER.

No. 246,273. Patented Aug. 23, 1881.

Witnesses
Fred G. Dieterich
A. H. Krause

Inventor
Leonard B. Berrien
By W. B. Richards
Attorneys (Model.)
3 Sheets—Sheet 2.
L. B. BERRIEN.
CORN PLANTER CHECK ROWER.
No. 246,273. Patented Aug. 23, 1881.
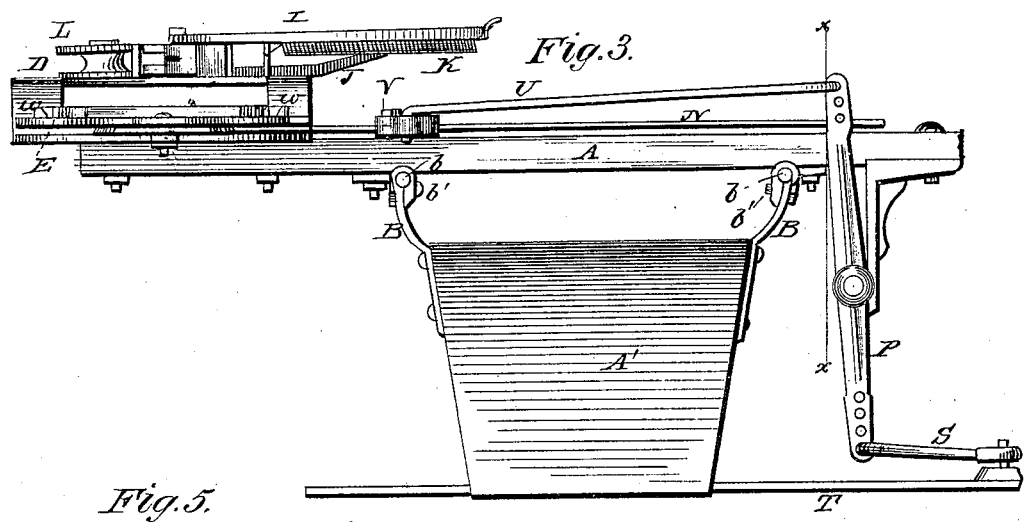
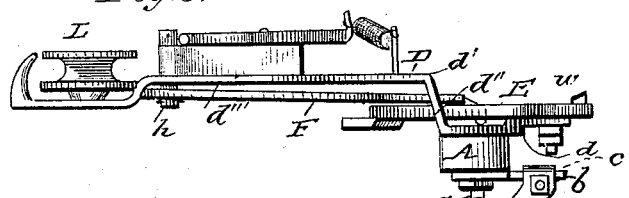
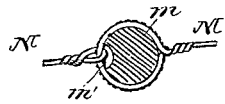
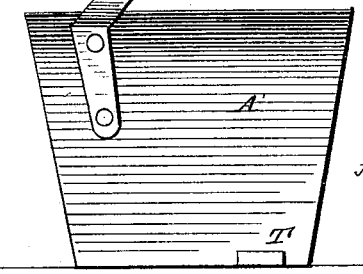
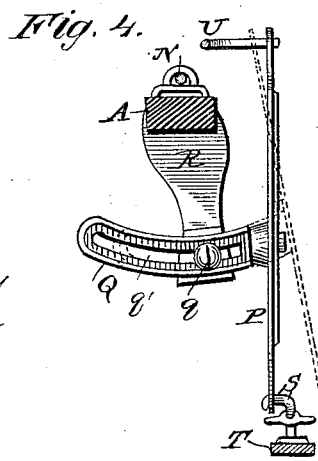
Witnesses
Fred. G. Dieterich
A. H. Krause
Inventor
Leonard B. Berrien
By W. B. Richards
Atty (Model.)
3 Sheets—Sheet 3.
L. B. BERRIEN.
CORN PLANTER CHECK ROWER.
No. 246,273. Patented Aug. 23, 1881.
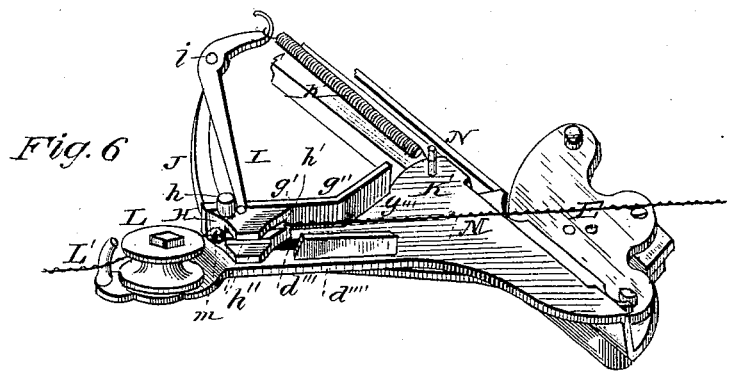
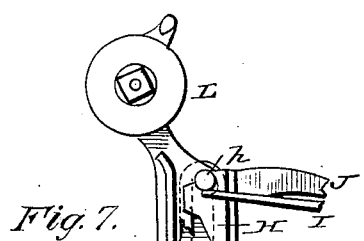
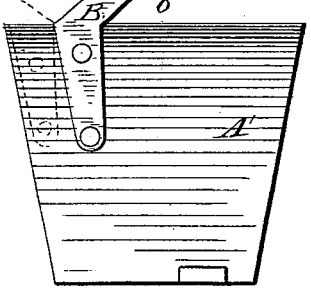
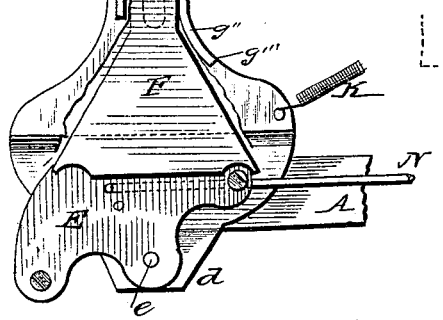
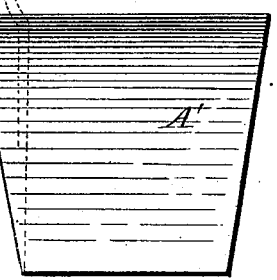
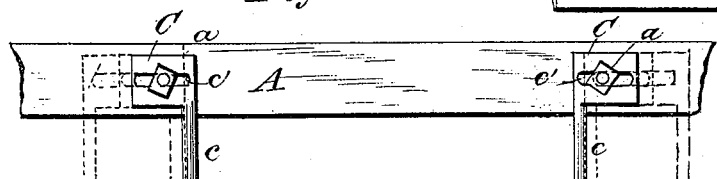
Witnesses
Fred. G. Dieterich
A. H. Krause
Inventor
Leonard B. Berrien
By W. B. Richards
atty

UNITED STATES PATENT OFFICE.

LEONARD B. BERRIEN, OF GALESBURG, ILLINOIS.

CORN-PLANTER CHECK-ROWER.

SPECIFICATION forming part of Letters Patent No. 246,273, dated August 23, 1881.

Application filed November 8, 1880. (Model.)

*To all whom it may concern:*

Be it known that I, LEONARD B. BERRIEN, a citizen of the United States, residing at Galesburg, in the county of Knox and State of Illinois, have invented certain new and useful Improvements in Corn-Planter Check-Rowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
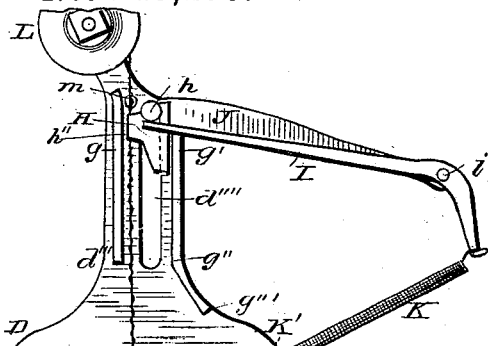
Figure 2:
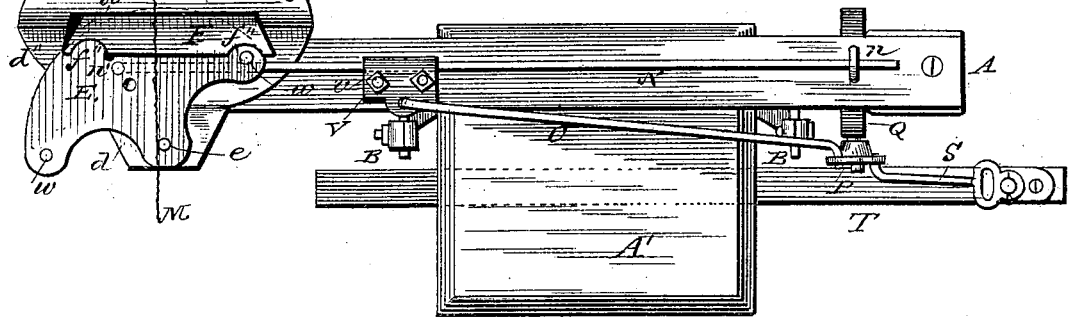
Figure 2:
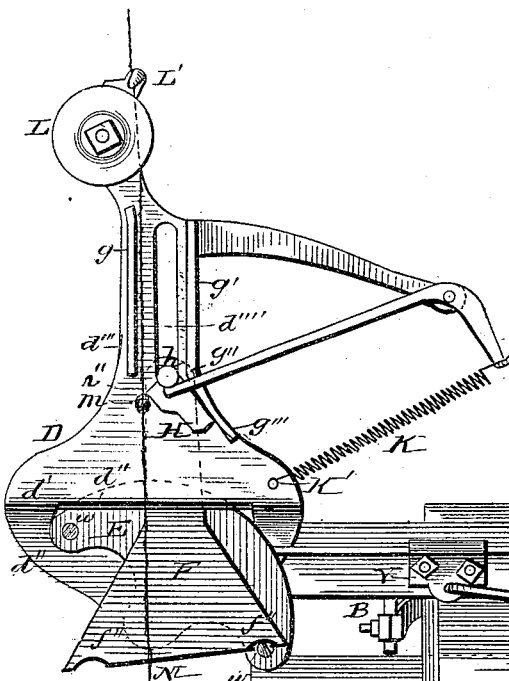

Figure 1 is a top plan of a corn-planter seed-box and slide-bar and of a construction embodying my invention mounted thereon. Fig. 2 is a top plan of same parts shown at Fig. 1, but in different relative positions. Fig. 3 is a rear side elevation of the parts shown at Fig. 1. Fig. 4 is a sectional elevation in the line $x\,x$ in Fig. 3. Fig. 5 is a side elevation. Fig. 6 is a perspective of the parts shown at left-hand side of Fig. 1, partly broken away. Fig. 7 is a top plan of the parts shown at Fig. 6, partly broken away to show the working parts. Figs. 8 and 9 are elevations, respectively, of left hand and rear sides of the seed-box. Fig. 10 is a plan, seen from below, of the frame-bar and plates for securing it to brackets from seed-boxes. Figs. 11 and 12 are enlarged plans of the knot on the check-row wire.

This invention relates to the following improvements in corn-planter check-rowers: first, to improvements in the devices for receiving motion from the check-row wire and transmitting motion to the planter seed-slides; second, to improvements in the method of securing the device to the planter; and, third, to the construction of the knotted wire chain; and it consists of constructions and combinations hereinafter described, and set forth in the claims hereto annexed.

Referring to the drawings by letters, letter A represents one end of a bar to which the working parts are secured. This bar A is secured to the seed-boxes A' by bent brackets B, so as to extend across the planter and project beyond each seed-box. The brackets B are bolted, bent edgewise at an angle, as shown in Fig. 8, and are one to each of two opposite sides of each seed-box, and have eyes $b$ at their upper ends, which receive round arms $c$, that project from plates C. The plates C have each a slot, $c'$, through which a bolt, $a$, passes to secure it to the bar A. Each bracket B is made in two parts, as shown at Fig. 9, held together by a bolt, $b'$, to form the eye $b$. The bar A may be adjusted forward and rearward relatively to the seed-boxes to adapt the device to differently-constructed planters by simply loosening the parts held by the bolt $b'$, and sliding the arms $c$ backward or forward in the eyes $b$, as shown by the broken lines at Fig. 8, and a still greater adjustment in same direction may be accomplished by turning the bent brackets and securing them to the seed-boxes in other positions, as shown by dotted lines at same figure.

To secure the bar A to planters in which the seed-boxes are at different distances from each other, the bolt $a$ may be loosened and the slotted plates C adjusted toward or from each other, as shown by dotted lines at Fig. 10, which adjustment may be still further increased by turning the plates C, as shown by dotted lines at same figure. By loosening the bolt $b'$, so that the arm $c$ may be turned in the eye $b$, the brackets may be adjusted to seed-boxes having inclined sides, as shown by full lines, or vertical sides, as shown by dotted lines at Fig. 9, and held by again tightening the bolt after the adjustment.

At each end of the bar A a plate, D, is secured, one of which is shown in the drawings on the end of the bar A. The plate D has a rear end, $d$, to which a rocking semicircular plate, E, is pivoted at $e$, a vertical part, $d'$, with a slot, $d''$, through which a triangular-shaped plate, F, reciprocates, and a forward part, $d'''$, with a slot, $d''''$. A shorter ledge, $g$, is located to one side of the slot $d''''$, and a longer ledge, $g'$, to its other side. The ledge $g$ extends rearward about same distance on the plate D as the slot $d''''$. The ledge $g'$ extends rearward beyond the end of the ledge $g$, and is curved outward at an angle, $g''$, to form an inclined part, $g'''$.

H is a sliding and rocking head, pivoted at its front end to the forward end of the plate F by a stud-bolt, h, which passes through the slot d''''. The back of the head H slides close to the ledge g', and its other side has a lengthwise groove, h', and projecting ears or lugs h'', as shown at Fig. 6.

I is an elbow-lever, pivoted at its bend i to the outer end of an arm, J. One end of the lever I rests against the rear side of the stud-bolt h, which projects above the head H for that purpose, and the other end is connected by a retracting-spring, K, with a stud, K', on the plate D.

L is a pulley journaled to the forward end of the plate D as a guide for the check-row wire M.

L' is a guard-pin to keep the wire M in contact with the pulley L.

A rod, N, extends across the machine through guards n on the bar A, and is pivoted at one end in either of a series of holes, n', to one plate, E, as shown in the drawings, and is similarly pivoted at its other end to the other plate, E, at the other end of the bar A. (Not shown.)

P is a lever centrally pivoted to one end of an arc-shaped bar, Q. The bar Q is adjustable lengthwise, and can be retained after adjustment by a set-screw, q, which passes through its slot q' into a bar, R, pendent from the bar A, as shown at Fig. 4. The lower end of the lever P is connected by a link, S, with the ordinary slide-bar, T, which extends across the machine, and is connected with and operates the seed-slides. The upper end of the lever P is connected by a link, U, with a head, V, which is adjustable on the rod N, and may be held after adjustment by set-screws v. The head V may thus be adjusted on the rod N, to adapt the device to planters of various widths, and the curved bar Q may be adjusted lengthwise, to adapt the lever P to machines differing in horizontal distance between the slide-bar T and the bar A where attached to different machines, as shown by dotted lines at Fig. 4.

The knots m on the check-row wire are at distances apart equal to the distance between the rows of corn to be dropped, and are formed as follows: The chain is made in short sections, and a metallic spherical ball, m, held between the adjacent ends of all of the sections, by grooving the ball and passing the end of one section around it and coiling it on the same section, so as to securely hold the ball or knot m. A slight groove, m', in the ball then permits the end of the wire of the other section to be interlocked with the section-eye which surrounds the ball, and afterward coiled upon itself to secure it to the other section, as shown at Figs. 11 and 12.

In operation the planter moves along the previously-stretched wire M in the direction shown by the arrow at Fig. 1, with said wire passing over the pulley L, back between the lugs h'' on the head H. As shown at Fig. 1, each knot m will strike the lugs h'', (which are too close together to permit the knot to pass between them,) and carry the head H back to the position shown at Fig. 2, where it (the head H) will be allowed to swing to one side on the bent ledge g' g''', and thus discharge the knot and allow it to pass backward. When the knot escapes from the head H it will be released and the spring K will retract the lever I, and thereby restore the head H again to the position shown at Fig. 1, and ready for the action of the next knot. The head H in moving rearward, by the action of the knot, as last described, will also carry the plate F rearward, and the notch f'' in one of its sides will engage with one of the studs w on the plate E, to bring it into position, as shown at Fig. 2, and thus give a movement to the seed-slides by their connection with the plate E by means of the rod N, links U S, and lever P, in the evident manner. When the head H is retracted by the spring K it will retract the plate F, which will slide back over the inclined rear side of whichever lug w is forward, and thus be brought again into position to act upon whichever of said lugs w is forward of the other, when the head H again moves rearward. When one plate E is being acted upon by the plate F, the other plate E at the other side of the planter will be oscillated also by the rod N, but will oscillate without acting on the plate F which is adjacent to it.

The plate D may be constructed very differently from that shown and described herein, as may also other parts of the device, and I do not limit my claims by any special construction of the parts; but

What I claim as new is—

1. In a check-rower, in combination with a knotted check-row chain, a head, H, adapted to move in a right line in contact with the knots on said chain, and to swing on the sliding arm, to which it is hinged, to release the knots.

2. In combination with a knotted check-row chain, a sliding head on which the knots on the chain act, a reciprocating plate moved by said head, and an oscillating plate moved by the throws in one direction of the reciprocating plate.

3. In combination with the sliding and swinging head H and reciprocating plate F, the elbow-lever I and spring K, substantially as and for the purpose specified.

4. The lever I and spring K, in combination with the sliding and swinging head H, sliding plate F, and oscillating plate, substantially as and for the purpose specified.

5. In combination with an oscillating plate, E, connected with and adapted to give motion to the seed-slides of a corn-planter, a reciprocating plate, F, connected with and receiving motion from a sliding head, H, which is acted upon by the knots on the check-row chain, substantially as and for the purpose specified.

6. In a check-rower, in combination with a knotted check-row chain, a sliding plate, F, adapted to act alternately on lugs w on a plate, E, to give an oscillating motion thereto, substantially as and for the purpose specified.

7. In combination with a knotted check-row chain and a sliding pivoted head, H, a ledge, $g'$, curved at its rear end, so as to permit the sliding head H to swing or tilt and allow the knot on the check-row chain to escape, substantially as and for the purpose specified.

8. In combination with a knotted check-row chain and slotted plate, a swinging or tilting and sliding head, H, having lugs $h''$ projecting to one side, on which the knots on the chain act to swing the head H on its pivot in said slot when the pivot reaches the end of the slot, and thereby release the knots from the head H, substantially as and for the purpose specified.

9. In combination with the sliding head H and knotted check-row chain, the ledge $g'$, adapted to guide the head H, and the ledge $g$, adapted to keep the wire chain in contact with the head H, substantially as and for the purpose specified.

10. In combination with the oscillating plates E and rod N, connecting them, the lever P, connected through the medium of link S with the seed-slides of the planter at one end, and at its other end to the rod N by a link and an adjustable head, V, substantially as and for the purpose specified.

11. In combination with the bar A, slide-bar T, links U and S, and lever P, the adjustable bar Q, substantially as and for the purpose specified.

12. The combination, with the seed-boxes A' and bar A, carrying the check-row devices, of brackets B, bent edgewise at an angle, substantially as shown, whereby they are adapted to be secured to said seed-boxes and turned so that their upper portions will project beyond their outer sides, substantially as and for the purpose herein described.

13. In combination with the seed-boxes A', bar A, carrying the check-row devices, and brackets B, having eyes $b$ in their upper ends, the plates C, having arms $c$, substantially as and for the purpose specified.

14. In combination with the seed-boxes A', bar A, carrying the check-row devices, and brackets B, having eyes $b$, the plates C, having arms $c$ and slots $c'$, substantially as and for the purpose specified.

15. A check-row chain formed of short sections and balls, the end of one section encircling the ball or knot, so as to hold it, and the adjacent end of the next section interlocked with the eye of the section which surrounds the ball, substantially as and for the purpose specified.

In testimony whereof I affix my signature in presence of two witnesses.

LEONARD B. BERRIEN.

Witnesses:
 H. A. ALLEN,
 M. W. SARGENT.